(12) United States Patent
Lee

(10) Patent No.: US 7,789,367 B2
(45) Date of Patent: Sep. 7, 2010

(54) TILT ANGLE ADJUSTING DEVICE WITH A SHAFT AND A MOMENT TRANSMISSION MEMBER, AND PROJECTOR INCLUDING THE DEVICE

(75) Inventor: Junsi Lee, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 0 days.

(21) Appl. No.: 11/206,991

(22) Filed: Aug. 19, 2005

(65) Prior Publication Data
US 2006/0043252 A1  Mar. 2, 2006

(30) Foreign Application Priority Data
Aug. 26, 2004 (JP) .............................. 2004-246602

(51) Int. Cl.
*A47B 91/00* (2006.01)
(52) U.S. Cl. ............... 248/349.1; 248/371; 248/398
(58) Field of Classification Search ........... 248/349.1, 248/371, 398, 291.1, 292.14, 299.1, 176.3; 16/342
See application file for complete search history.

(56) References Cited

U.S. PATENT DOCUMENTS

| | | | | |
|---|---|---|---|---|
| 4,714,223 A | * | 12/1987 | Kamaya | 248/291.1 |
| 5,219,240 A | * | 6/1993 | Kitamura | 403/84 |
| 5,593,119 A | * | 1/1997 | Moore et al. | 248/185.1 |
| 5,730,406 A | * | 3/1998 | Chen | 248/223.41 |
| 6,364,271 B2 | * | 4/2002 | Iitsuka | 248/371 |
| 2002/0073508 A1 | * | 6/2002 | Rude | 16/341 |
| 2003/0122046 A1 | * | 7/2003 | Huong | 248/291.1 |
| 2005/0284990 A1 | * | 12/2005 | Souza et al. | 248/122.1 |

FOREIGN PATENT DOCUMENTS

| | | |
|---|---|---|
| JP | 2001-42423 | 2/2001 |
| JP | 2003-110966 | 4/2003 |
| JP | 2004-20670 | 1/2004 |
| JP | 2004-109359 | 4/2004 |

OTHER PUBLICATIONS

Japanese Office Action dated Apr. 3, 2008 with a partial English translation.

* cited by examiner

*Primary Examiner*—J. Allen Shriver, II
*Assistant Examiner*—Bradley H Duckworth
(74) *Attorney, Agent, or Firm*—McGinn IP Law Group, PLLC

(57) ABSTRACT

A tilt angle adjusting device has a shaft configured to be fixed to a bottom surface of a housing at least one end, and a moment transmission member connected to the shaft. The moment transmission member allows relative rotation between the shaft and the moment transmission member when a moment equal to or more than a predetermined value is applied about an axis of the shaft from the housing, and restricts the relative rotation when the moment is released. The moment transmission member includes a leg configured to be placed on a surface on which the housing is installed. The leg is provided with part of a bearing to support the shaft. The moment transmission member also includes a plate member to press an outer peripheral surface of the shaft. The plate member forms the rest of the bearing.

2 Claims, 7 Drawing Sheets

PRIOR ART

TILT ANGLE ADJUSTING DEVICE WITH A SHAFT AND A MOMENT TRANSMISSION MEMBER, AND PROJECTOR INCLUDING THE DEVICE

BACKGROUND OF THE INVENTION

1. Field of the Invention

The present invention relates to a tilt angle adjusting device and a projector equipped with the tilt angle adjusting device. More particularly, the present invention relates to a device for adjusting the orientation of a projector.

2. Description of the Related Art

A typical projector is equipped with a tilt angle adjusting device to adjust a longitudinal and a transverse inclination of the projector in accordance with various situations. Conventional tilt angle adjusting devices are generally classified into two types according to the tilt angle adjusting mechanism. In a tilt angle adjusting device of the first type, extending lengths of tilt feet arranged on the bottom of a housing are varied in order to incline the housing in a longitudinal and/or transverse direction. In a tilt angle adjusting device of the second type, a housing is tiltably mounted on a pedestal and tilted on the pedestal in order to incline the housing in a longitudinal and/or transverse direction.

Irrespective of which type of tilt angle adjusting device is used, a change in the longitudinal inclination of projector 100 causes a change in the projected angle of the centerline of image light in the vertical direction (referred to as a projection angle hereinafter), so that a displayed position of image 101 is moved up and down, as illustrated in FIG. 1. On the other hand, a change in the transverse inclination of projector 100 causes a change in the projected angle of the centerline of image light in the horizontal direction (referred to as an image angle hereinafter), so that image 101 is displayed such that the upper right or the upper left portion of the image is raised, as illustrated in FIG. 2.

FIGS. 3A to 3D illustrate examples of projectors which are equipped with a tilt angle adjusting device according to the first type. Projectors 102 of FIGS. 3A to 3D are commonly equipped with at least one tilt foot 105 on bottom surface 104 of housing 103. In projector 102 illustrated in FIG. 3A, one tilt foot 105 is arranged in the front portion of bottom surface 104, and two fixed legs 106 are arranged in the rear portion of bottom surface 104. The term "fixed leg" used herein refers to a leg, the length of which cannot be adjusted, unlike tilt foot 105. In projector 102 illustrated in FIG. 3B, one tilt foot 105 is arranged in the front portion of bottom surface 104, and one tilt foot 105 and one fixed leg 106 are arranged in the rear portion of bottom surface 104. In projector 102 illustrated in FIG. 3C, two tilt feet 105 are arranged in the front portion of bottom surface 104, and one fixed leg 106 is arranged in the rear portion of bottom surface 104. In projector 102 illustrated in FIG. 3D, two tilt feet 105 are arranged in the front portion of bottom surface 104, and two fixed legs 106 are arranged in the rear portion of bottom surface 104.

In projector 102 illustrated in FIG. 3A, tilt foot 105 can be lengthened or shortened to adjust the projection angle. In projector 102 illustrated in FIG. 3B, front and rear tilt feet 105 can be lengthened or shortened to adjust the projection angle and the image angle independently of each other. In projectors 102 illustrated in FIGS. 3C, 3D, two front tilt feet 105 can be lengthened or shortened to adjust both the projection angle and the image angle at one time.

Another example of the first type of a tilt angle adjusting device is described in the specification etc. of Japanese Patent Laid-open Publication No. 2001-42423 (Document 1). The tilt angle adjusting device described herein comprises a support leg pivotally arranged on the bottom surface of a housing of a projector; and a fixing mechanism for fixing the support leg at a desired angle. The fixing mechanism comprises an operating gear which rotates in association with pivotal movements of the support leg, and a rotating gear fixed to the housing. The operating gear usually meshes with the rotating gear. The operating gear, however, is released from engagement with the rotating gear when it slides in the horizontal direction. Specifically, as a release button is pushed, the operating gear slides in the horizontal direction away from the rotating gear to allow the operating gear to be released from engagement with the rotating gear, and to allow pivotal movement of the support leg. As the release button is released after the support leg has been pivotally moved to a desired angle, the operating gear slides in the opposite direction and comes into mesh with the rotating gear to lock the support leg.

The specification etc. of Japanese Patent Laid-open Publication No. 2004-109359 (Document 2) describes a projector which has a tilt angle adjusting device of the second type. The projector described herein is provided with a hemispherical protrusion on the bottom surface of the housing of the projector. A pedestal on which the projector is mounted has a top surface provided with a hole into which the protrusion is fitted. Thus, as the projector is placed on the pedestal such that the protrusion is fitted into the hole, the projector can be inclined to the front, back, right, and left on the pedestal, as well as rotated in the horizontal direction.

Although the tilt angle adjusting device illustrated in FIG. 3A can adjust the projection angle, it cannot adjust the image angle, and although the tilt angle adjusting device illustrated in FIG. 3B can adjust both the projection angle and image angle, it cannot adjust them at one time. Therefore, either the projection angle or the image angle must be adjusted first, then followed by the adjustment of the other. Although the tilt angle adjusting mechanisms illustrated in FIGS. 3C, 3D can adjust the projection angle and image angle at one time, they cannot adjust them independently of each other (i.e., individually). Further, to adjust the angles, any of the tilt angle adjusting devices illustrated in FIGS. 3A-3D must be lifted up to raise the tilt foot (feet), resulting in complicated and burdensome adjustment work.

The projector described in Document 1 involves complicated and burdensome work for adjustments, because the release button must be pushed each time the angle is adjusted. Further, the housing must be lifted up to raise the support leg to adjust the angle, similar to the tilt angle adjusting devices illustrated in FIGS. 3A-3D.

In the projector described in Document 2, the orientation of the housing is only maintained by the frictional resistance of the surface of the protrusion with the periphery of the hole. As such, the orientation can vary with only small force applied to the housing. Further, if the housing is inclined at an excessive angle, the frictional resistance of the surface of the protrusion with the periphery of the hole may not be sufficient to maintain the orientation of the housing. Even if the orientation is maintained, the orientation of the housing is liable to vary with any slight force.

SUMMARY OF THE INVENTION

It is an object of the present invention to provide a tilt angle adjusting device which is capable of adjusting the orientation of a projector with highly simple operations and of ensuring that the adjusted orientation is maintained. It is another object of the present invention to provide a projector equipped with the tilt angle adjusting device.

A tilt angle adjusting device comprises a shaft configured to be fixed to a bottom surface of a housing at at least one end, and a moment transmission member connected to the shaft. The moment transmission member allows relative rotation between the shaft and the moment transmission member when a moment equal to or more than a predetermined value is applied about an axis of the shaft from the housing, and restricts the relative rotation when the moment is released.

According to one aspect of the present invention, the moment transmission member includes a leg configured to be placed on a surface on which the housing is installed. The leg is provided with part of a bearing to support the shaft. The moment transmission member also includes a plate member to press an outer peripheral surface of the shaft. The plate member forms the rest of the bearing.

As force is applied toward the bottom surface at one side of the top surface of the housing in a width direction, rotation moment is caused about the shaft which serves as a center of rotation. On the other hand, since the outer peripheral surface of the shaft is pressed against the bearing formed on the leg, a frictional resistance is caused between the outer peripheral surface of the shaft and the surface of the bearing. Therefore, as the rotation moment exceeds the frictional resistance, the shaft rotates, causing a pivotal movement of the housing fixed to the shaft. On the other hand, when no external force is applied to the top surface of the housing, or when external force is applied to the housing that only generates rotation moment that is smaller than the frictional resistance, the shaft will not rotate, so that no pivotal movement of the housing will occur.

According to another aspect of the present invention, the moment transmission member includes a first disk provided with a plurality of teeth on one side, a second disk provided with a plurality of teeth on a surface opposite to the first disk, the teeth of the second disk meshing with the teeth of the first disk, a resilient member to press the second disk against the first disk, and a leg configured to be placed on a surface on which the housing is installed, the leg being fixed to the first disk. The shaft extends through the first disk, the second disk, and the resilient member, and is configured to restrict rotation of the second disk about an axis of the shaft. The first disk, the second disk, and the resilient member are configured such that when a moment equal to or more than a predetermined value is applied to the shaft, the second disk is moved in an axial direction of the shaft against the resilient member, to disengage the teeth of the first disk from the teeth of the second disk.

As force is applied downward from the top surface of the housing, rotating moment is caused about the shaft that is fixed to the housing. Only when this rotating moment is equal to or larger than a predetermined value, the locking state of the shaft, which is caused by the engagement of the first disk with the second disk, is released to permit the housing to pivot. Further, since the first disk is engaged with the second disk by the mesh of the teeth formed on opposite surfaces of the disks, the housing pivots by an angle corresponding to one tooth in a stepwise manner.

The housing is inclined to the left or right just by pushing the top surface of the housing with force equal to or larger than a predetermined value, consequently the image angle is adjusted. When the operator stops pushing the top surface of the housing, the housing is automatically locked and the image angle is securely maintained.

A projector according to the present invention includes the tilt angle adjusting device described above.

The above and other objects, features and advantages of the present invention will become apparent from the following description with reference to the accompanying drawings which illustrate examples of the present invention.

DETAILED DESCRIPTION OF THE INVENTION

Figure 1:
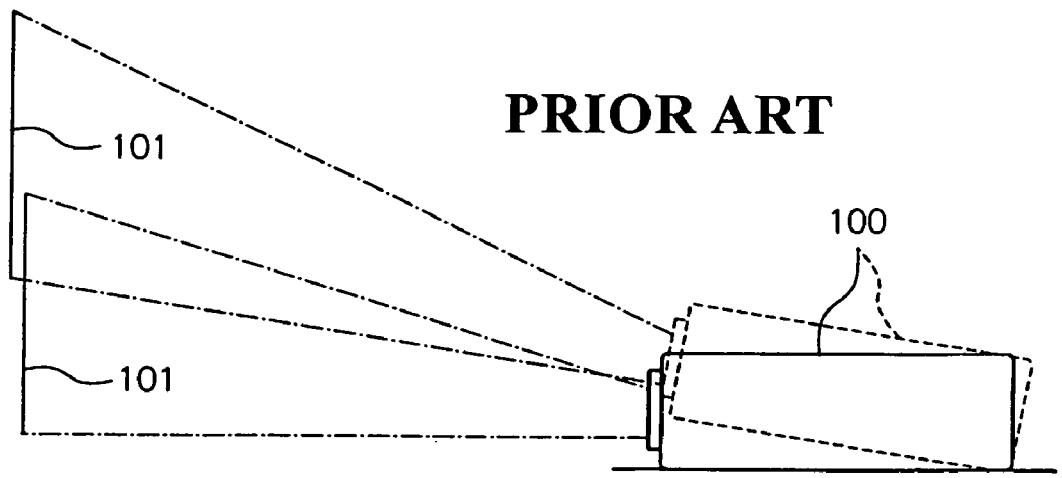
FIG. 1 is an explanatory diagram illustrating the adjustment of a projection angle.
Figure 2:
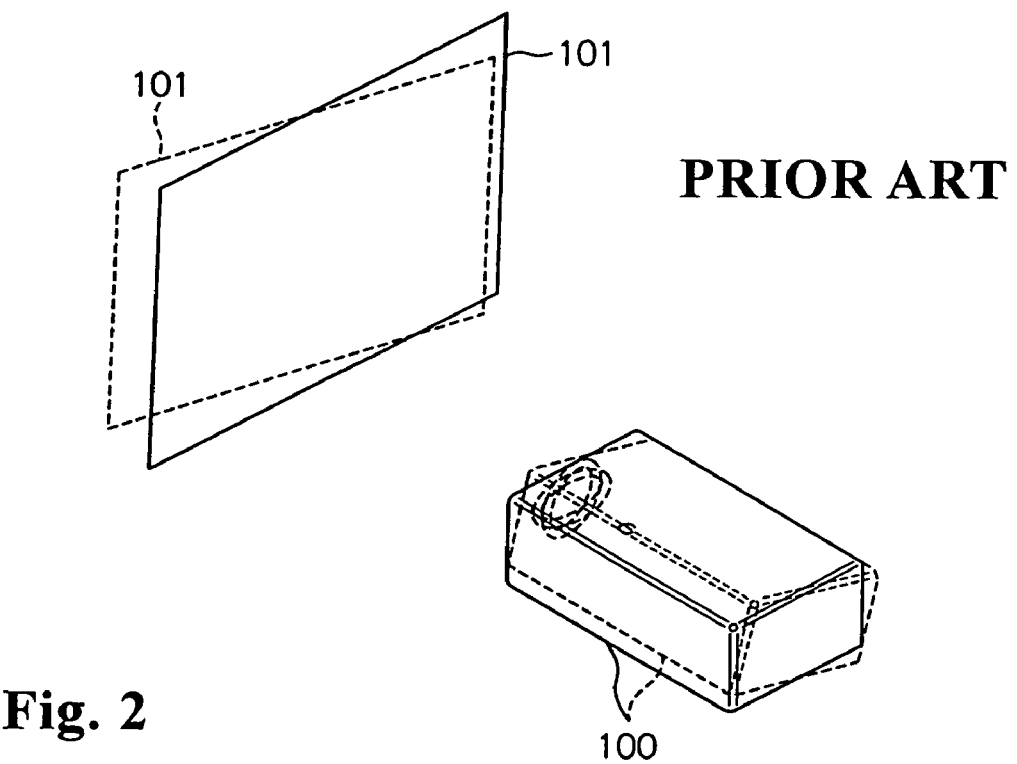
FIG. 2 is an explanatory diagram illustrating the adjustment of an image angle.
Figure 3A:
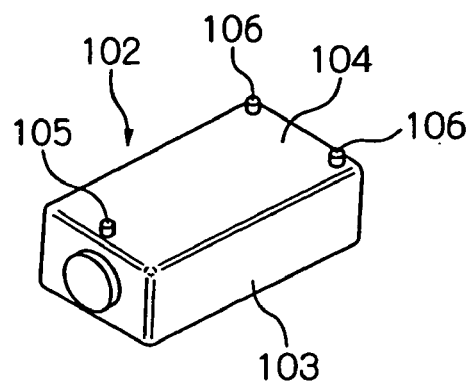
FIGS. 3A to 3D are perspective views of tilt angle adjusting devices according to prior arts.
Figure 3B:
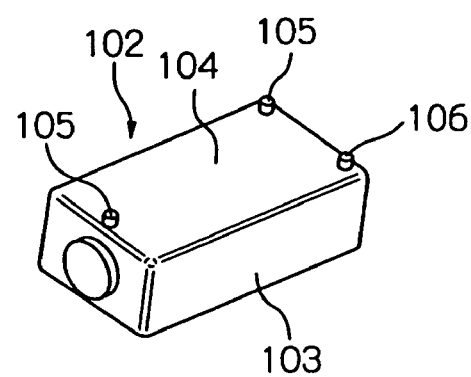
Figure 3C:
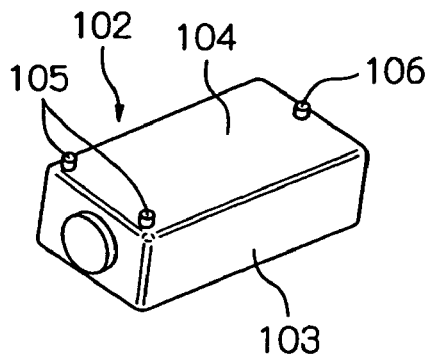
Figure 3D:
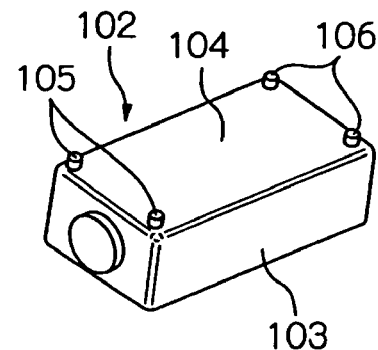
Figure 4:
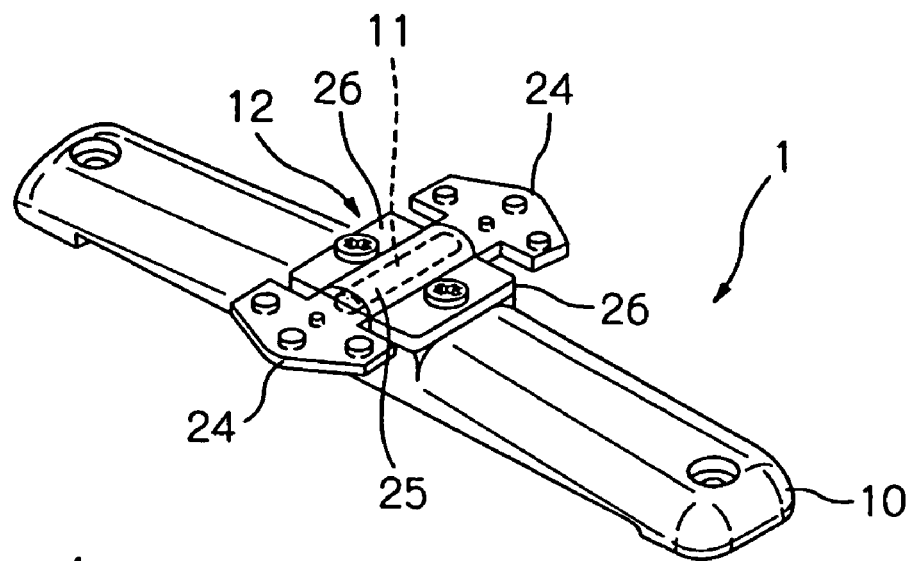
FIG. 4 is a perspective view illustrating an embodiment of a tilt angle adjusting device equipped in a projector according to the present invention.
Figure 5:
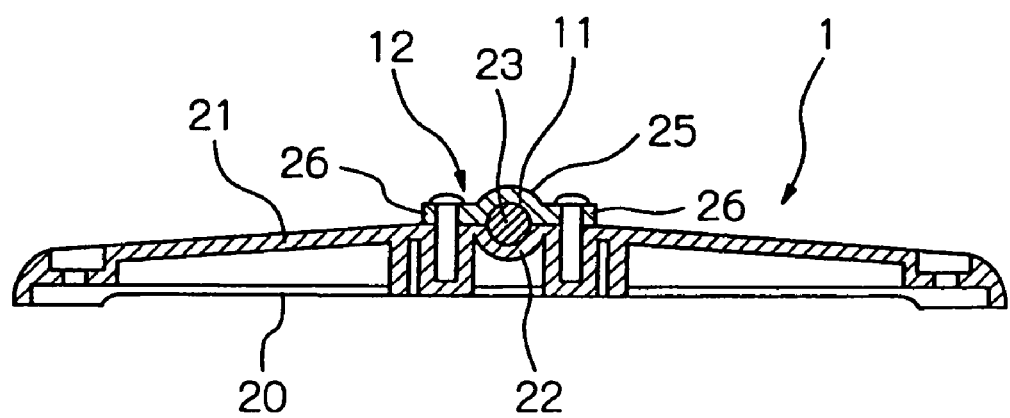
FIG. 5 is a cross-sectional view of the tilt angle adjusting device illustrated in FIG. 4.

A first embodiment of a projector according to the present invention will be described. As illustrated in FIGS. 4 and 5, tilt angle adjusting device 1 has leg 10, shaft 11, and clamp plate 12. Leg 10 has an elongate shape. Bottom surface 20 is substantially flat, and top surface 21 gradually approaches bottom surface 20 from the center of top surface 21 towards the both ends. Thus, leg 10 is tapered narrowing down in a longitudinal direction. Semi-arc shaped bearing 22 is formed at the longitudinal center of top surface 21 of leg 10. Shaft 11 includes a round-bar shaft section 23, and plate-shaped brackets 24 arranged at both axial ends of shaft section 23. Semi-arc recess 25 which covers shaft section 23 of shaft 11 is formed at the center of clamp plate 12. Flanges 26 are formed integrally with recess 25 on both ends thereof.

As clearly illustrated in FIG. 5, a radially lower half of shaft section 23 of shaft 11 is fitted in bearing 22 of leg 10. The remaining radially upper half of shaft section 23 that is fitted in bearing 22 of leg 10 is covered with recess 25 of clamp plate 12. Flanges 26 of clamp plate 12 are fixed to top surface 21 of leg 10 with screws. Recess 25 has a slightly smaller radius of curvature than shaft section 23. Therefore, the inner surface of recess 25 is pressed against the outer peripheral surface of shaft section 23 with a pressure equal to or higher than a predetermined value. As a result, frictional resistance F1 is caused between the contact surfaces.

Figure 6:
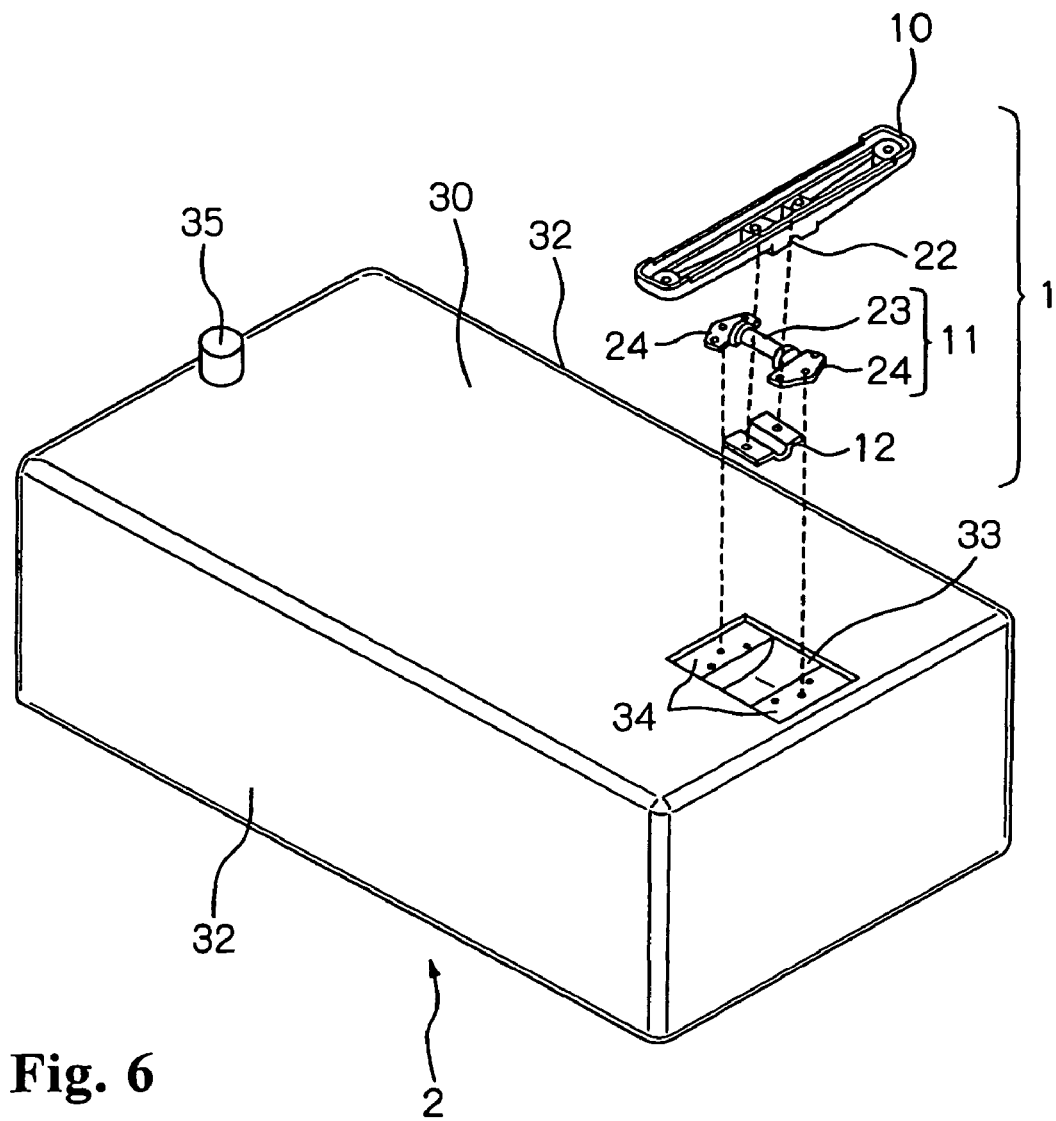
FIG. 6 is an exploded perspective view illustrating a method for mounting the tilt angle adjusting mechanism to a projector.

As illustrated in FIG. 6, tilt angle adjusting device 1 provided with the foregoing structure is mounted in a rear portion (opposite to the plane on which a projection lens is arranged) of housing bottom surface 30 of projector 2. Specifically, housing bottom surface 30 is provided in its rear portion with mount area 33 which forms a recess on housing 32, with stages 34 to fix brackets 24 of shaft 11, formed in front and at the back of mount area 33. Brackets 24 are fixed to corresponding stages 34 with screws, not shown. In other words, leg 10 is coupled with housing 32 pivotally about shaft 11 which serves as an axis of rotation. Tilt foot 35 is provided in the front portion of the bottom surface 30 of housing, to move the front side of housing 32 in an up/down direction to adjust the projection angle (launching angle). Tilt foot 35, which is arranged on the axis of shaft 11, is similar to the conventional tilt foot in structure. Detailed description of tilt foot 35 is omitted.

Figure 7:
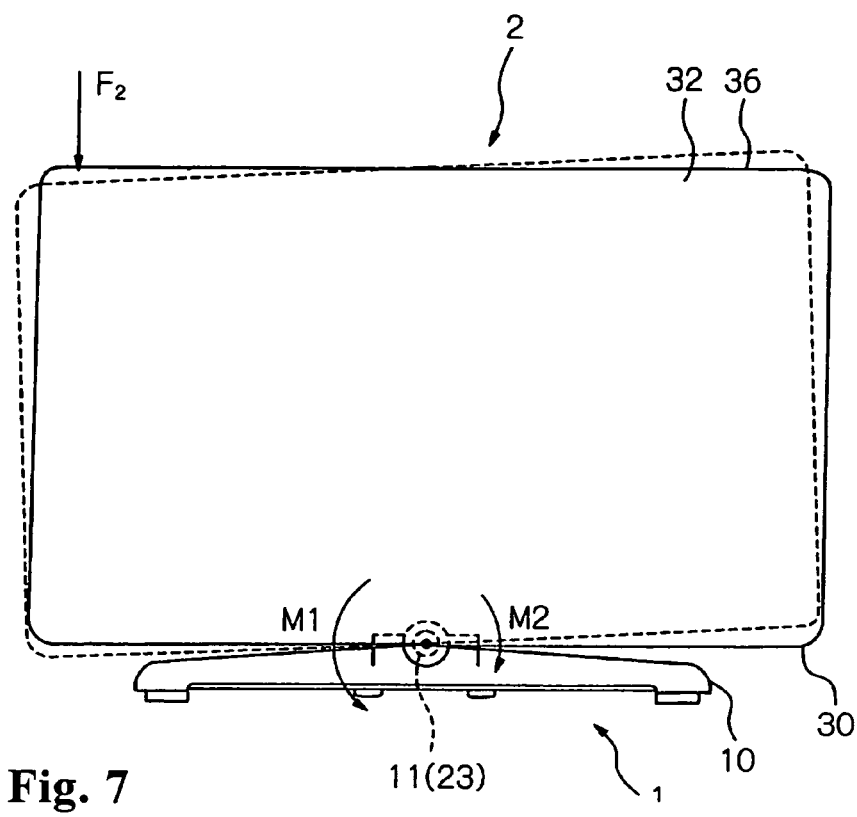
FIG. 7 is a schematic rear view illustrating an embodiment of a projector according to the present invention.

The tilt angle can be adjusted in the following manner for projector 2 of the structure as described above. As illustrated in FIG. 7, as force F2 is applied downward at one of the sides of top surface 36 of housing 32 in a width direction (longitudinal direction of leg 10), rotation moment M1 is caused about shaft section 23 of shaft 11. On the other hand, frictional resistance F1 is caused between the surfaces of bearing 22 and recess 25 and the outer peripheral surface of shaft section 23 of shaft 11. Therefore, as rotation moment M1 is applied, reaction moment M2 is caused. When rotation moment M1 becomes larger than reaction moment M2, housing 32 pivots about fixed leg 35 which serves as a fulcrum (FIG. 6) in the direction in which rotation moment M1 is applied (in the counter-clockwise direction in FIG. 7). In other words, while the relationship $M1 \leq M2$ is being established housing 32 is locked, and pivots only when the relationship $M1 > M2$ is satisfied. Thus, housing 32 is inclined to the left or right only by pushing upper surface 36 of housing 32 of projector 2 installed on a table or a desk, and the image angle of a projected image is accordingly adjusted. Further, when the pressing force is released at top surface 36, housing 32 is automatically locked to hold the image angle.

Figure 8:
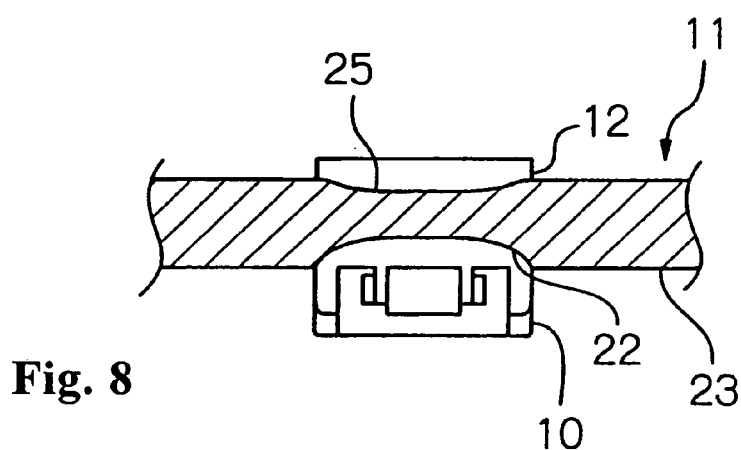
FIG. 8 is a partially enlarged cross-sectional view illustrating a modification to the tilt angle adjusting device illustrated in FIG. 4.

Next, a modification to the above-described tilt angle adjusting device will be described with reference to FIG. 8. In the tilt angle adjusting device illustrated in FIG. 8, shaft section 23 has an axially central portion arranged between bearing 22 of leg 10 and recess 25 of clamp plate 12. The central portion has a smaller diameter than the remaining portion of shaft section 23. Bearing 22 and recess 25 have arcuate surfaces which are able to be in close contact with the narrowed central portion of shaft section 23. With this structure, displacement of leg 10 in the axial direction of shaft 11 is restricted. Further, a force is constantly maintained on bearing 22 of leg 10 to ensure that bearing 22 is kept in contact with the narrowest portion of shaft section 23. Even if any external force acts on leg 10 to displace it temporarily in the axial direction of shaft 11, leg 10 will immediately return to the original position.

Figure 9:
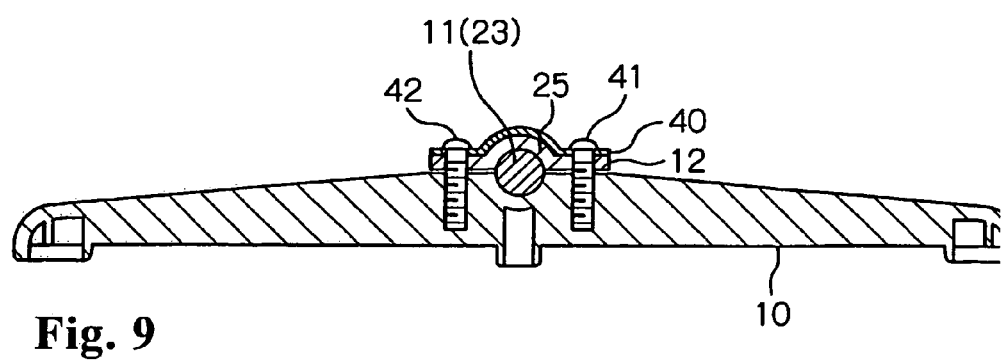
FIG. 9 is an enlarged cross-sectional view illustrating another modification to the tilt angle adjusting device illustrated in FIG. 4.

Another modification of the tilt angle adjusting device will be described with reference to FIG. 9. In the tilt angle adjusting device illustrated in FIG. 9, clamp plate 12 is overlaid with a second clamp plate (auxiliary clamp plate 40), and both plates are fastened together to leg 10 with common screws 41, 42. As clamp plate 12 suffers from deformation and/or creep due to aging and so on, frictional resistance may be reduced between the surface of recess 25 and the outer peripheral surface of shaft section 23 of shaft 11, which may lower the capability to maintain the orientation of the housing, not shown. Clamp plate 12 is overlaid with auxiliary clamp plate 40, which does not have a surface in contact with shaft section 23, to prevent creep in clamp plate 12. Thus, the reduction in the capability to maintain the orientation of the housing, which may result from a reduction in frictional resistance, can be avoided. It should be noted that creep is a common phenomenon with resin, and therefore, if clamp plate 12 is made of resin, this makes auxiliary clamp 40 particularly effective. Auxiliary clamp plate 40 is preferably formed of metal which is less likely to suffer from creep than resin. If auxiliary clamp plate 40 has a proper resiliency, it can usually press clamp plate 12 to shaft section 23 effectively as well as prevent creep.

Leg 10, shaft 11, clamp plate 12, and brackets 24 which are of the above-mentioned structure may be entirely or partially made of resin or metal material. These components can be manufactured by an appropriate process such as molding, die casting, pressing, and the like.

A second embodiment of a projector according to the present invention will be described next. The projector of the second embodiment differs from the first embodiment only in the structure of the tilt angle adjusting device. Therefore, the following description will be focused on the structure of the tilt angle adjusting device, and description of the projector itself will be omitted.

Figure 10:
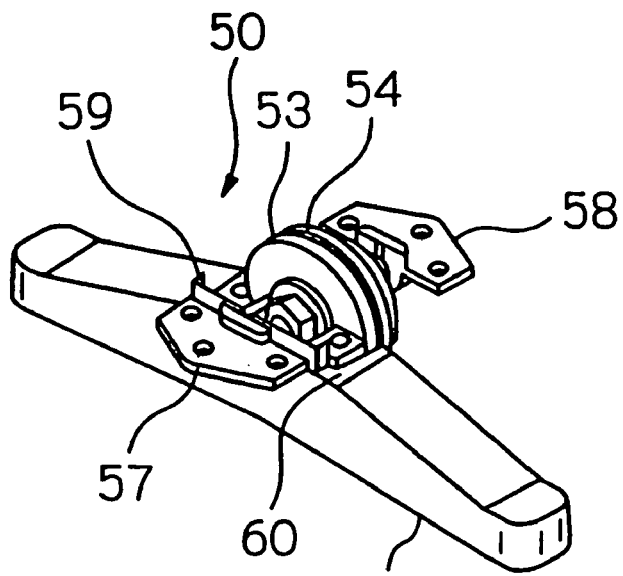
FIG. 10 is a perspective view illustrating another embodiment of a tilt angle adjusting device equipped in a projector according to the present invention.
Figure 11:
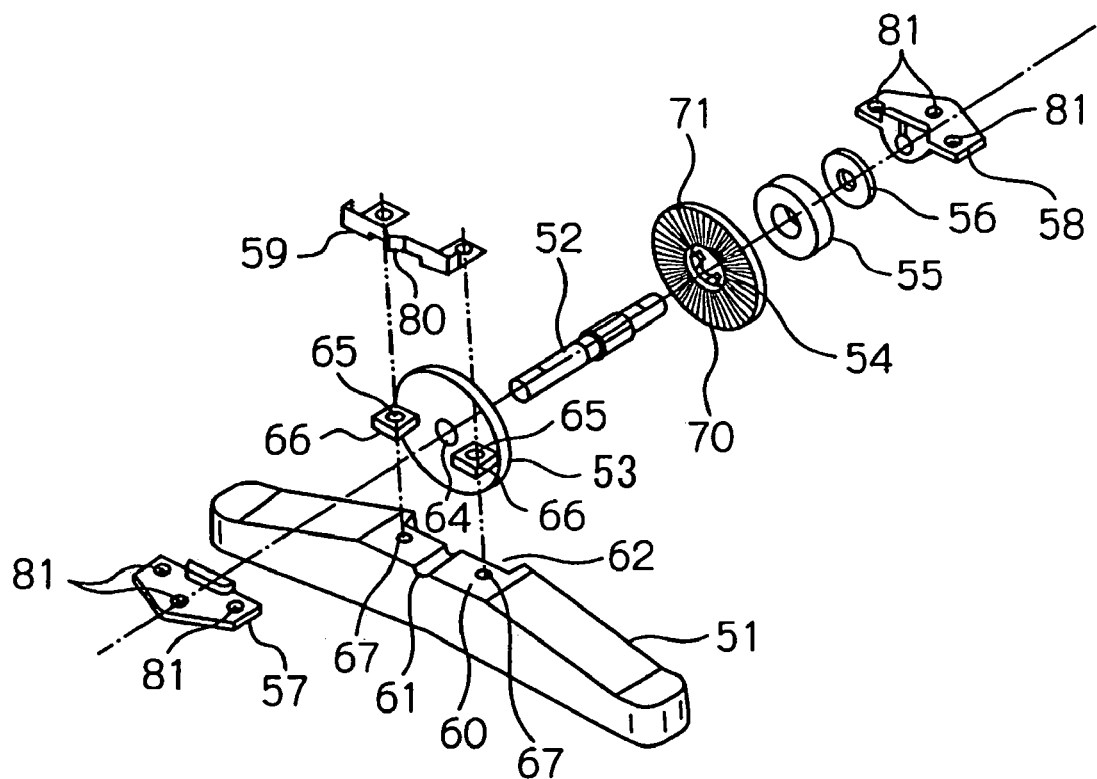
FIG. 11 is an exploded perspective view of the tilt angle adjusting device illustrated in FIG. 10.

As illustrated in FIGS. 10 and 11, tilt angle adjusting device 50 comprises leg 51, shaft 52, first disk 53, second disk 54, resilient member 55, spacer 56, brackets 57, 58, and positioning member 59.

Leg 51 has an elongated shape, with semi-arcuate bearing 61 formed on the top surface in the central portion of leg 51 in the longitudinal direction (hereinafter referred to as central top surface 60). Semi-arcuate recess 62, into which first disk 53 is fitted, is formed on leg 51 on the back surface of the central portion in the longitudinal direction.

Circular hole 64 is formed through the center of first disk 53 through which shaft 52 extends. A large number of teeth 82 (FIG. 13) are formed along the circumferential direction on the back surface of first disk 53. Fixed pieces 66, provided with throughholes 65, are disposed on the front surface of first disk 53 and extend in the axial direction of shaft 52. First disk 53 is fixed to leg 51 by screws (not shown) which extend through throughholes 65 of fixed piece 66 into screw holes 67 formed on central top surface 60 of leg 51. First disk 53 is thus integrated with leg 51.

Second disk 54, which has substantially the same shape as first disk 53, is provided with a large number of teeth 70 on the surface which is opposite to the back surface of first disk 53. Teeth 70 mesh with teeth 82 formed on the back surface of first disk 53. Hole 71 is formed on second disk 54 through which shaft 52 is inserted. Hole 71 is not circular but polygonal.

Shaft 52 does not have a uniform cross section in the axial direction. A portion of shaft 52 that is inserted into hole 64 of first disk 53 has a circular cross section, similar to hole 64, and a portion that is inserted into hole 71 of second disk 54 has a polygonal cross section, similar to hole 71. Therefore, shaft 52 can rotate about the axis independently of first disk 53, but cannot rotate independently of second disk 54. It means that when either shaft 52 or second disk 54 rotates, the other (52 or 54) also rotates in the same direction. However, second disk 54 can be independently displaced in the axial direction of shaft 52.

Figure 12:
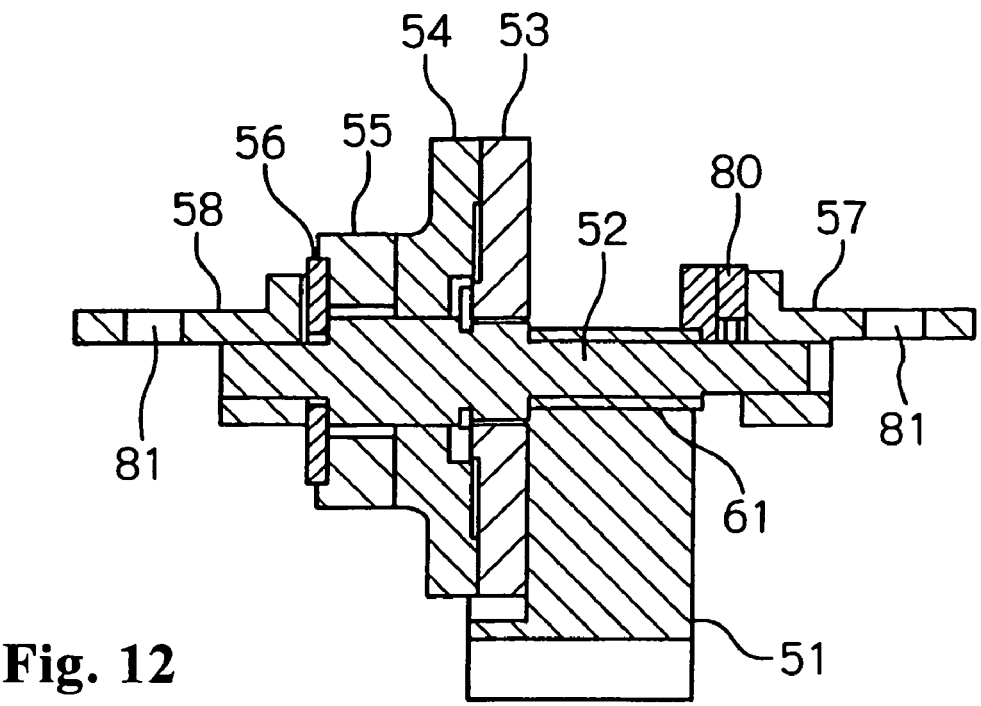
FIG. 12 is a partially enlarged cross-sectional view illustrating the structure of the tilt angle adjusting device illustrated in FIG. 10.

One end of shaft 52 extends through second disk 54, annular resilient member 55, and spacer 56. Bracket 58 is fixed to the end. Specifically, as illustrated in FIG. 12, resilient member 55 and spacer 56 are sandwiched between the back surface of second disk 54 and bracket 58, such that second disk 54 is usually pressed against first disk 53 by the resilient force of resilient member 55. The other end of shaft 52 extends through first disk 53, and is supported from below by bearing 61 formed on central top surface 60 of leg 51. Bracket 57 is fixed to the end.

Referring again to FIG. 11, positioning member 59 is fastened to central top surface 60 of leg 51 by common screws (not shown) which also fix fixed pieces 66 of first disk 53 to central top surface 60 of leg 51. Protrusion 80 which is substantially triangular in shape is formed at the center of positioning member 59 by having it pressed into this shape. Positioning member 59 and bracket 57 are positioned such that protrusion 80 of positioning member 59 fits in a groove (not shown) formed in bracket 57 only when bracket 57 is parallel with leg 51.

Figure 13:
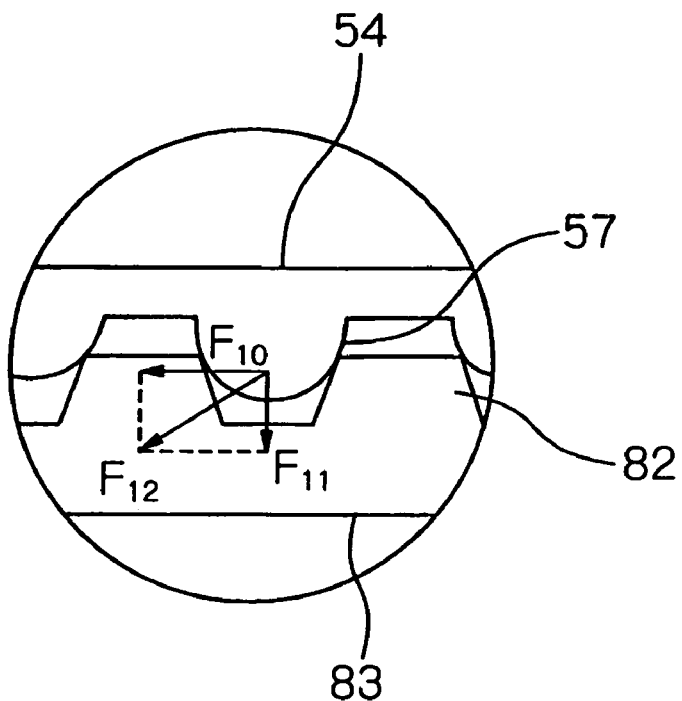
FIG. 13 is a partially enlarged diagram for illustrating forces acting between the teeth of a first disk and teeth of a second disk.

The tilt angle adjusting device having the above-mentioned structure is fixed to the housing of a projector (not shown) by screws (not shown) which extend through screw holes 81 formed in brackets 57, 58 arranged on both ends of shaft 52, and which extends into the back surface of the housing of the projector. Therefore, the housing is coupled with leg 51 pivottaly about shaft 52 which serves as an axis of rotation. As a result, similar to the embodiment illustrated in FIG. 7, as force is applied downward at one of the sides of the top surface of the housing in a width direction (longitudinal direction of leg 51), rotation moment is caused about shaft 52. Assume that the force applied to the housing is F10, the force with which resilient member 55 presses second disk 54 against first disk 53 is F11, and the combined force acting on the surface of teeth 57 of second disk 54 that engages with teeth 82 of first disk 53 is F12. The relationship between these forces is illustrated in FIG. 13. Thus, as F12 becomes larger than F11, second disk 54 is displaced in the axial direction of shaft 52 (to the left in FIG. 12) against the resilient force of resilient member 55. Teeth 57 of second disk 54 is released from engagement with teeth 82 of first disk 53, to cause second disk 54 and shaft 52 to rotate by an angle corresponding to one tooth. As a result, the housing also pivots by an angle corresponding to one tooth in the direction in which the rotation moment is caused. In the foregoing manner, tilt angle adjusting device 50 can rotate the housing to the left or to the right to adjust the image angle in a stepwise manner.

Further, when bracket 57 is positioned parallel with leg 51 while the housing of the projector is rotated to the left or to the right, protrusion 80 of positioning member 59 fits into the groove of bracket 57. This fitting motion produces a clicking sound and tactile feedback to the hand of an operator who is applying force to the housing. As such, the operator can easily and securely know the horizontal orientation of the housing. The force required to disengage protrusion 80 of positioning member 59 fitted in the groove of bracket 57 from that groove may be smaller than the force required to release the engagement of teeth 82 of first disk 53 from teeth 57 of second disk 54.

Additionally, a stopper may be provided between the surface of first disk 53 and recess 62 into which first disk 53 is fitted, in order to limit displacements of first disk 53 in the axial direction of shaft 52. Preferably, a notch may be formed in recess 62 in order to avoid interference of the stopper with recess 62. Further, a stopper may be provided between spacer 56 and bracket 58, in order to avoid excessive displacements of second disk 54 in the axial direction of shaft 52.

While certain preferred embodiments of the present invention have been shown and described in detail, it should be understood that various changes and modifications may be made without departing from the spirit or scope of the appended claims.

What is claimed is:

1. An adjusting device formed on a housing of a projector, said device comprising:
    a leg comprising a recessed portion;
    a shaft disposed in said recessed portion and comprising a pair of brackets which are formed on opposing axial ends of the shaft and include a flat surface that is configured to be fixed to a pair of staged portions formed in a recess in a bottom surface of said housing; and
    a clamp plate comprising a recessed portion and a flange which is fixed by a fixing member to an upper surface of said leg, said recessed portion of said leg and said recessed portion of said clamp plate forming a bearing for supporting a portion of said shaft which is between said pair of brackets,
    wherein said recessed portion of said leg and said recessed portion of said clamp plate contact an outer periphery of said shaft over a length of said shaft between said pair of brackets and apply a frictional resistance to said outer periphery of said shaft over said length of said shaft between said pair of brackets to restrict a rotation of said shaft.

2. A projector comprising:
    a housing comprising a bottom surface including a recess and a pair of staged portions formed in the recess; and
    an adjusting device formed on said housing, said device comprising:
        a leg comprising a recessed portion;
        a shaft disposed in said recessed portion and comprising a pair of brackets which are formed on opposing axial ends of the shaft and include a flat surface that is fixed to the pair of staged portion; and
        a clamp plate comprising a recessed portion and a flange which is fixed by a fixing member to an upper surface of said leg, said recessed portion of said leg and said recessed portion of said clamp plate forming a bearing for supporting a portion of said shaft which is between said pair of brackets,
    wherein said recessed portion of, said leg and said recessed portion of said clamp plate contact an outer periphery of said shaft over a length of said shaft between said pair of brackets and apply a frictional resistance to said outer periphery of said shaft over said length of said shaft between said pair of brackets to restrict a rotation of said shaft.

* * * * *